United States Patent [19]

Blanchard et al.

[11] 3,926,067

[45] Dec. 16, 1975

[54] CLUTCH FOR GEAR TRAINS

[75] Inventors: James S. Blanchard, Indianapolis; Robert F. Weaver, Jamestown, both of Ind.

[73] Assignee: P.R. Mallory & Co. Inc., Indianapolis, Ind.

[22] Filed: May 6, 1974

[21] Appl. No.: 467,388

[52] U.S. Cl.................................. 74/461; 74/411
[51] Int. Cl.².................... F16H 55/14; F16H 57/00
[58] Field of Search................ 74/461, 434, 411

[56] References Cited
UNITED STATES PATENTS

| | | | |
|---|---|---|---|
| 2,017,139 | 10/1935 | Wood............................. | 74/461 UX |
| 2,992,715 | 7/1961 | Blackly........................... | 74/461 X |
| 3,304,795 | 2/1967 | Rouverol........................ | 74/461 X |
| 3,739,654 | 6/1973 | De Toma........................ | 74/461 |

*Primary Examiner*—Leonard H. Gerin
*Attorney, Agent, or Firm*—Charles W. Hoffmann; Robert F. Meyer; Donald W. Hanson

[57] ABSTRACT

A clutch comprises flexible teeth on one gear that can be deflected by gear teeth of another gear to interrupt normal running of the two gears.

7 Claims, 3 Drawing Figures

CLUTCH FOR GEAR TRAINS

Generally speaking, the present invention relates to an improved clutch for a gear train comprising gear teeth on one gear engaging flexible gear teeth on another gear, whereby the gears can run together in a normal fashion or disengage in a clutching fashion in either direction of rotation of the gears.

Clutches are widely used in gear trains to periodically provide a discontinuation of rotary motion transmitted through the gears. A large variety of clutches are known, examples of which include ratchet/pawl devices and friction clutches. A disadvantage of many such clutches is that, by the very nature of their existence, they add additional parts to a gear train. This results in added cost, decreased reliability, and space-consuming bulk.

The present invention provides a clutch incorporated in the gears of a gear train. The clutch requires no additional parts and occupies no more space than the gears. And, the present invention, by its very nature, provides for quiet running of the gear train.

Accordingly, it is a feature of the present invention to provide a clutch for a gear train that includes flexible gear teeth carried by one of the gears of the gear train. Another feature of the present invention is to provide a clutch for a gear train that includes flexible teeth carried by each of two engaging gears of the gear train. Another feature of the present invention is to provide a clutch for a gear train that provides a noise dampening reaction between gear teeth of two engaging gears of the gear train. Yet another feature of the present invention is to provide a clutch for a gear train that is economical and reliable.

These and other features will become more apparent from the following description taken in conjunction with the accompanying drawings wherein.

Figure 1:
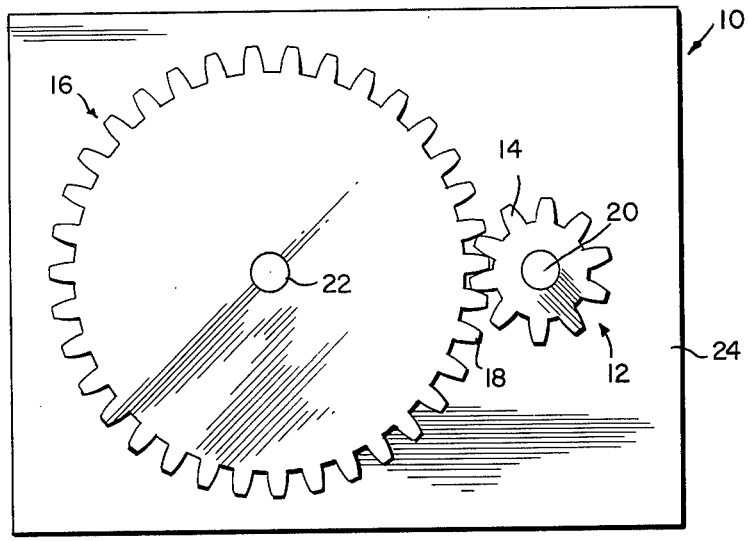
FIG. 1 shows two gears in engagement, one of which has flexible teeth.

In FIG. 1 there is shown a gear train 10 generally comprising a first gear 12 with rigid teeth 14 and a gear 16 with flexible teeth 18. Gears 12 and 16 are rotatably carried on shafts 20 and 22, respectively, extending from a housing 24. It should be understood that the invention can be applied to any two engaging gears located anywhere in any gear train and not just to the simplified example of FIG. 1.

Figure 2:
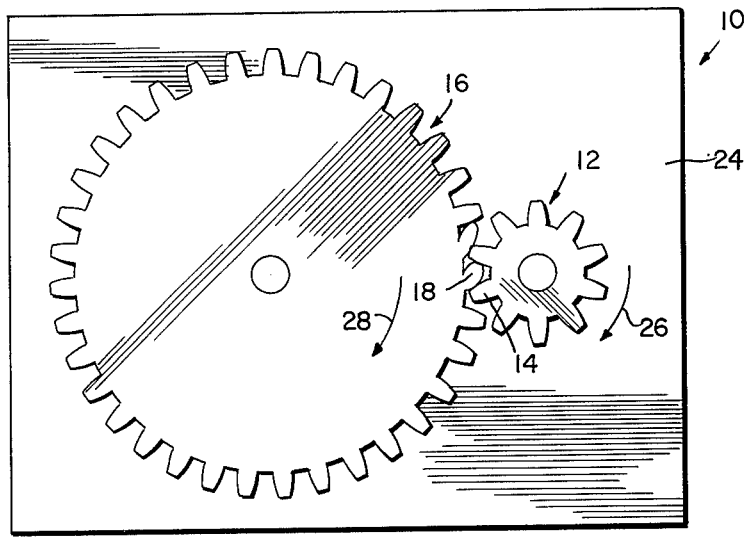
FIG. 2 shows two gears, one of which has flexible teeth thaht are shown deflecting.

In FIG. 2, the clutching action between first and second gears 12 and 16 is illustrated. This clutching action can be the result of two conditions. The first condition occurs when the rotation of gear 16 is impeded, and gear 12 rotates in the direction of arrow 26. In this condition the rigid teeth 14 of gear 12 push flexible teeth 18 of gear 16, aside and the normal gearing synchronization between gears 12 and 16 is broken. The second condition providing the clutching action shown in FIG. 2 occurs when the rotation of gear 12 is impeded, and gear 16 rotates in the direction of arrow 28. In this case flexible teeth 18 of gear 16 deflect in the manner illustrated and thus slip past teeth 18 of gear 12. When the impediment to normal running of gear 12 is removed, the gears rotate in a normal gearing fashion well known in the art. The flexible teeth provide for quiet running of the gears due to a mechanical impedance mismatch between the hard material rigid teeth 14 and the relatively soft, flexible teeth 18. This mismatch results in a noise dampening action between gears 12 and 16.

Figure 3:
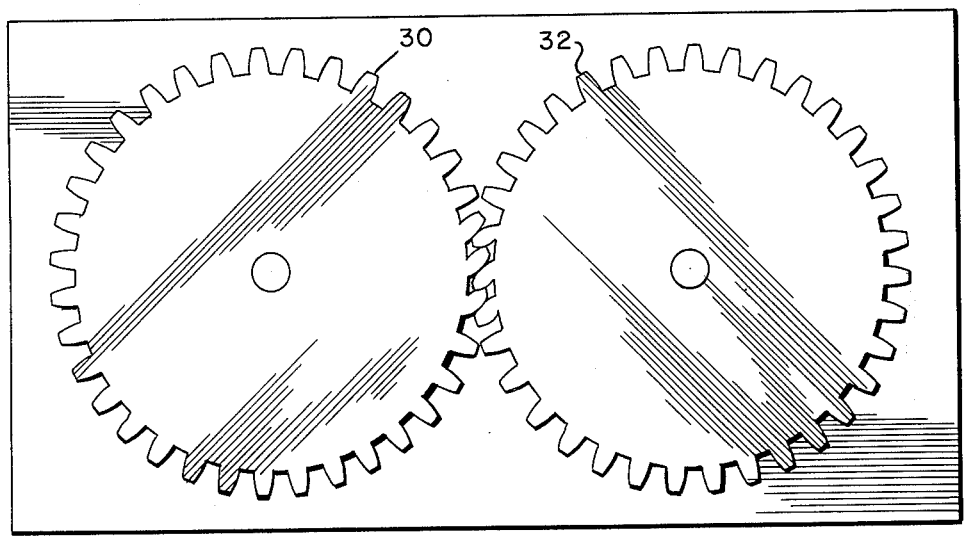
FIG. 3 illustrates two flexible gears, teeth of each deflecting.

FIG. 3 shows another embodiment of the present invention wherein two flexible gears 30 and 32 are shown in a condition where the teeth of each are deflecting and moving past one another as a result of one of the gear's rotation having been impeded in relation to the rotation of the other. When this impediment is removed the gears rotate in a normal gearing fashion well known in the art.

A material for flexible teeth 18 should be flexible enough to allow teeth 18 to deflect past teeth 14 without placing undue stress or wear on teeth 14. The material must also be highly fatigue resistant to prevent the constantly bending teeth 18 from failing. At the same time, the material for flexible teeth 18 must also be rigid enough to allow normal running of gears 12 and 16 when neither's motion is impeded. One example of such material is polyurethane such as Texin 591A. Texin 591A is a registered trademark owned by Mobay Chemical Company of Pittsburg, Pa.

What is claimed is:

1. In a gear train that includes a first gear rotatably carried by a housing, a second gear rotatably carried by said housing and in running engagement with said first gear, an improved clutch comprising:
   a. first gear teeth disposed on said first gear; and
   b. second gear teeth disposed on said second gear adapted for operating in running engagement with said first gear teeth and having sufficient flexibility to permit deflection past said first gear teeth upon impediment of rotation of one of said first and second gears;
   c. whereby said first and second gears can run together in a normal gear-to-gear fashion or slip past one another in a clutching fashion.

2. The improved clutch as recited in claim 1 wherein said first gear teeth are flexible.

3. The improved clutch as recited in claim 1 wherein said first gear teeth are rigid.

4. A method of selectively interrupting running engagement of first and second gears, one of which includes flexible teeth, and the other of which includes rigid teeth comprising the steps of:
   a. impeding rotation of said first gear;
   b. continuing rotation of said second gear; and
   c. deflecting said flexible teeth of one of said gears out of disengagement with said rigid teeth of the other of said gears, thereby interrupting running engagement of said first and second gears.

5. The method as recited in claim 4 wherein said first gear includes flexible teeth and said second gear includes rigid teeth.

6. The method as recited in claim 4 wherein said first gear includes rigid teeth and said second gear includes flexible teeth.

7. A method of selectively interrupting running engagement of first and second gears, each having flexible teeth, comprising the steps of:
   a. impeding rotation of said first gear;
   b. continuing rotation of said second gear; and
   c. deflecting said flexible teeth of said first and second gears out of engagement with each other, thereby interrupting running engagement of said first and second gears.

* * * * *